US010394782B2

(12) United States Patent
Nam

(10) Patent No.: US 10,394,782 B2
(45) Date of Patent: Aug. 27, 2019

(54) CHORD DISTRIBUTED HASH TABLE-BASED MAP-REDUCE SYSTEM AND METHOD

(71) Applicant: UNIST (Ulsan National Institute of Science and Technology), Ulsan (KR)

(72) Inventor: Beomseok Nam, Ulsan (KR)

(73) Assignee: UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 196 days.

(21) Appl. No.: 15/516,878

(22) PCT Filed: Jun. 10, 2015

(86) PCT No.: PCT/KR2015/005851
§ 371 (c)(1),
(2) Date: Apr. 4, 2017

(87) PCT Pub. No.: WO2016/199955
PCT Pub. Date: Dec. 15, 2016

(65) Prior Publication Data

US 2017/0344546 A1 Nov. 30, 2017

(51) Int. Cl.
*G06F 17/30* (2006.01)
*G06F 16/22* (2019.01)
(Continued)

(52) U.S. Cl.
CPC ............ *G06F 16/2255* (2019.01); *G06F 9/48* (2013.01); *G06F 16/00* (2019.01);
(Continued)

(58) Field of Classification Search
CPC ........... G06F 17/3033; G06F 17/30587; G06F 17/30864; G06F 17/30477; G06F 17/30;
(Continued)

(56) References Cited

U.S. PATENT DOCUMENTS 8,868,711 B2 10/2014 Skjolsvold et al.
9,934,147 B1 * 4/2018 Bent ........................ G06F 3/06
(Continued)

FOREIGN PATENT DOCUMENTS

EP 2 634 997 A1 9/2013
KR 10-2014-0096936 A 8/2014
KR 10-2014-0119090 A 10/2014

OTHER PUBLICATIONS

Patent Cooperation Treaty, International Search Report and Written Opinion of the International Searching Authority, International Application No. PCT/KR2015/005851, dated Feb. 29, 2016, 10 Pages (with English Translation).

*Primary Examiner* — Greta L Robinson
(74) *Attorney, Agent, or Firm* — Fenwick & West LLP

(57) ABSTRACT

A chord distributed hash table based MapReduce system includes multiple servers and a job scheduler. The multiple servers include file systems and in-memory caches storing data based on a chord distributed hash table. The job scheduler manages the data stored in the file systems and the in-memory caches in a double-layered ring structure, when receiving a data access request for a specific file from an outside. The job scheduler allocates MapReduce tasks to the servers that store the file for which the data access request has been received among the multiple servers, and outputs a result value obtained by performing the MapReduce tasks in response to the data access request.

14 Claims, 7 Drawing Sheets

(51) Int. Cl.

| | |
|---|---|
| ***G06F 16/951*** | (2019.01) |
| ***G06F 16/2455*** | (2019.01) |
| ***G06F 9/48*** | (2006.01) |
| ***G06N 7/00*** | (2006.01) |
| ***G06F 16/00*** | (2019.01) |
| ***G06F 16/28*** | (2019.01) |

(52) U.S. Cl.
CPC .......... *G06F 16/2455* (2019.01); *G06F 16/28* (2019.01); *G06F 16/951* (2019.01); *G06N 7/005* (2013.01)

(58) Field of Classification Search
CPC ........ G06F 9/48; G06F 16/2255; G06F 16/00; G06F 16/28; G06F 16/2455; G06F 16/951; G06N 7/005
See application file for complete search history.

(56) References Cited

U.S. PATENT DOCUMENTS

| | | | |
|---|---|---|---|
| 2008/0120314 A1 | 5/2008 | Yang et al. | |
| 2009/0247207 A1* | 10/2009 | Lor | H04L 29/12132 455/517 |
| 2010/0076930 A1* | 3/2010 | Vosshall | G06F 17/30575 707/638 |
| 2012/0278323 A1 | 11/2012 | Chattopadhyay et al. | |
| 2013/0318222 A1* | 11/2013 | Luong | G06F 17/30 709/223 |

* cited by examiner

Updated Hash Key Access Probability Distribution
(Exponential Moving Average)

CHORD DISTRIBUTED HASH TABLE-BASED MAP-REDUCE SYSTEM AND METHOD

TECHNICAL FIELD

The present invention relates to a distributed file system, and more particularly to a chord distributed hash table based MapReduce system and method capable of achieving load balancing and increasing a cache hit rate by managing data in a double-layered ring structure having a file system layer and an in-memory cache layer based on a chord distributed hash table, and after predicting a probability distribution of data access requests based on the frequency of a user's data access requests, adjusting a hash key range of the chord distributed hash table of the in-memory cache layer and scheduling tasks based on the predicted probability distribution.

BACKGROUND ART

Cloud computing means that a plurality of computers are linked as one cluster to constitute a cloud serving as a virtual computing platform and data storage and computation are delegated to the cloud which is a cluster of computers rather than an individual computer. Cloud computing is widely used in various fields, particularly in recent years, a 'Big Data' field.

Big Data refers to a huge amount of data of petabytes or more beyond terabytes. Since Big Data cannot be processed by a single computer, cloud computing is regarded as a basic platform for processing Big Data.

Meanwhile, as a representative example of the cloud computing environment for Big Data, Apache's Hadoop system is popular.

The Hadoop includes a Hadoop Distributed File System (HDFS) that allows input data to be divided and processed, and data that has been distributed and stored is processed by a MapReduce process developed for high-speed parallel processing of large amounts of data in a cluster environment.

However, the Hadoop distributed file system is configured as a central file system such that a manager for managing directories is provided centrally and performs all management processes to figure out what data is stored in each server and, thus, has a drawback in that it manages an excessively large amount of data, thereby degrading the performance.

Further, in the Hadoop distributed file system, the file is divided appropriately without taking the contents of the file into consideration and then distributed and stored in multiple servers. Accordingly, necessary data may be stored in only a specific server, and no data may be stored in a certain server.

Therefore, when the Hadoop receives a MapReduce task request, since several map functions are executed only in the server storing a large amount of specific data required for processing the MapReduce task request, there is a problem that a load balance cannot be achieved, thereby degrading the performance.

SUMMARY OF THE INVENTION

In view of the above, the present invention provides a chord distributed hash table based MapReduce system and method capable of achieving load balancing and increasing a cache hit rate by managing data in a double-layered ring structure having a file system layer and an in-memory cache layer based on a chord distributed hash table, and after predicting a probability distribution of data access requests based on the frequency of a user's data access requests, adjusting a hash key range of the chord distributed hash table of the in-memory cache layer and scheduling tasks based on the predicted probability distribution.

In accordance with an aspect, there is provided a chord distributed hash table based MapReduce system including multiple servers and a job scheduler. The multiple servers include file systems and in-memory caches storing data based on a chord distributed hash table. The job scheduler manages the range of hash keys of data stored in the file systems and the in-memory caches in a double-layered ring structure, when receiving a data access request for a specific file from an outside. The job scheduler allocates MapReduce tasks to the servers whose hash key ranges cover the hash key of data the tasks access among the multiple servers, and outputs intermediate calculation results obtained by performing the MapReduce tasks in response to the data access request.

The job scheduler, when receiving the data access request, retrieves a server storing the file by extracting a hash key with a name of the file and checking a hash key range assigned to the in-memory cache of each server, receives metadata for the file from the retrieved server, and allocates the MapReduce tasks to the servers storing the file.

The job scheduler receives, as the metadata, a data block structure for the file and information about servers storing distributed data blocks, and allocates the MapReduce tasks to the servers storing the data blocks.

The in-memory cache stores data having a hash key included in a hash key range maintained by the in-memory cache by using the chord distributed hash table. For example, when the in-memory cache stores a data block, the in-memory cache stores the data block having a hash key included in a hash key range assigned to the in-memory cache.

The job scheduler dynamically changes and sets, for each server, the hash key range of the in-memory cache of each server depending on frequency of requests for data access to each server.

The job scheduler stores, in the file system, an intermediate calculation result generated in the MapReduce task processing for each data block of the file.

The intermediate calculation result is generated to have a different hash key according to each data block and distributed to a different server.

The intermediate calculation result is stored in an intermediate result reuse cache area of the in-memory cache.

The chord distributed hash table based MapReduce system further includes a resource manager interworking with the job scheduler to manage server addition, removal and recovery or manage an upload of files.

In accordance with another aspect, there is provided a method of performing MapReduce tasks in a chord distributed hash table based MapReduce system including multiple servers including file systems and in-memory caches and a job scheduler allocating MapReduce tasks to the servers. In the method, managing, by the job scheduler, data stored in the file systems and the in-memory caches in a double-layered ring structure; receiving a data access request for a specific file from an outside; retrieving a server of a file system storing the file by extracting a hash key for the file; receiving, as metadata, a data block structure for the file and information about servers storing distributed data blocks from the retrieved server; allocating MapReduce tasks to the servers storing the data blocks; and outputting intermediate calculation results obtained by performing the MapReduce tasks in response to the data access request.

The file systems and the in-memory caches store the data based on a chord distributed hash table.

The in-memory cache stores a hash key corresponding to data by using the chord distributed hash table, and after assigning a preset hash key range to the in-memory cache, stores a hash key corresponding to the hash key range and data corresponding to the hash key.

The hash key range is dynamically changed and set for each server depending on frequency of requests for data access to each server.

The MapReduce tasks are processed in the servers storing the data blocks, and an intermediate calculation result generated in the MapReduce task processing is stored in the file system.

The intermediate calculation result is generated to have a different hash key according to each data block and distributed to a different server.

The intermediate calculation result is stored in an intermediate result reuse cache area of the in-memory cache.

Effect of the Invention

According to the present invention, there is an advantage in that it is possible to achieve load balancing and increase a cache hit rate by managing data in a double-layered ring structure having a file system layer and an in-memory cache layer based on a chord distributed hash table, and after predicting a probability distribution of data access requests based on the frequency of the user's data access requests, adjusting the hash key range of the chord distributed hash table of the in-memory cache layer and scheduling tasks based on the predicted probability distribution.

Further, according to the present invention, a chord distributed file system is used instead of a central-controlled distributed file system. In the chord distributed file system, each server managing a chord routing table can access a remote file directly without using metadata managed centrally. Accordingly, it is possible to ensure scalability.

Furthermore, the cache hit rate can be increased by using in-memory caches which actively utilize a distributed memory environment, indexing key-value data using the chord distributed hash table, and storing not only input data but also an intermediate calculation result generated as a result of the map task in the in-memory cache.

In addition, the indexing of the in-memory cache is managed independently of the chord distributed hash table for managing the file system, and the hash key range is adjusted dynamically according to the frequency of data requests. Accordingly, it is possible to achieve uniform data access for each server.

Moreover, a job scheduler checks which server's in-memory cache stores necessary data based on the distributed hash key ranges and performs scheduling such that data can be reused by applying a locality-aware fair scheduling algorithm. If the data requests are focused on specific data, by adjusting the hash key range, it is possible to achieve uniform data access to all servers.

BRIEF DESCRIPTION OF THE DRAWINGS

The objects and features of the present invention will become apparent from the following description of embodiments, given in conjunction with the accompanying drawings, in which.

DETAILED DESCRIPTION

Embodiments of the present invention will be described in detail hereinafter with reference to the accompanying drawings. In the following description of the present invention, a detailed description of known functions and configurations incorporated herein will be omitted for conciseness. The terms to be described later are terms defined in consideration of their functions in the present invention, and they may be different in accordance with the intention of a user/operator or custom. Accordingly, they should be defined based on the contents of the whole description of the present invention.

First, in the present invention, a chord distributed file system is used instead of a conventional central-controlled distributed file system such as Hadoop. In the chord distributed file system, each server managing a chord routing table can access a remote file directly without using metadata managed centrally. Accordingly, scalability can be ensured.

Figure 1:
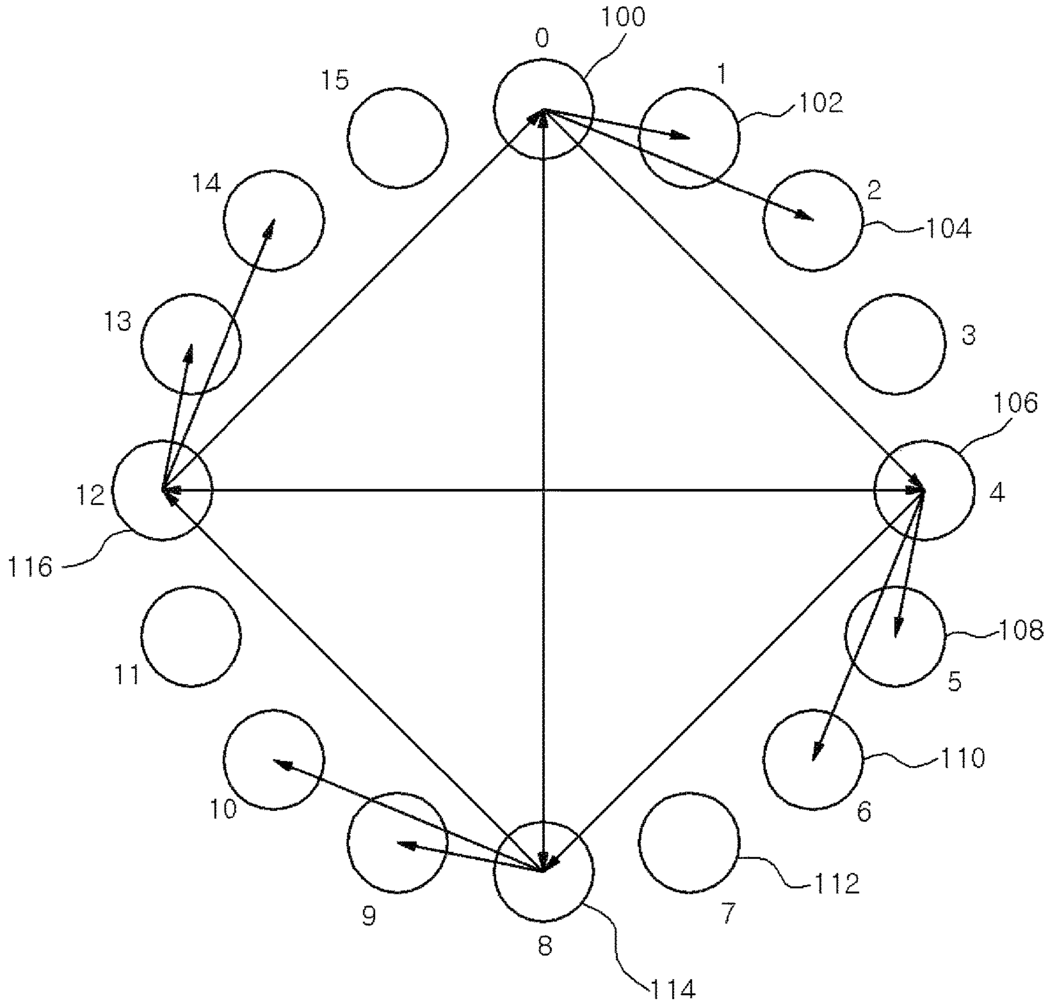
FIG. 1 is a conceptual diagram of an operation of a chord distributed file system according to an embodiment of the present invention.

FIG. 1 illustrates a concept of a file system to which a chord distributed hash table (DHT) based MapReduce system according to the embodiment of the present invention has been applied.

Hereinafter, an operation of the chord distributed file system of the present invention will be described in detail with reference to FIG. 1.

In a conventional central-controlled distributed file system, a central directory stores all of information on data held in each node. On the other hand, the chord distributed file system is implemented such that each node has information about neighboring nodes.

That is, each node may be implemented to have information about an immediately adjacent node and neighboring nodes having hash key numbers obtained by multiplying the hash key number of the adjacent node by 2 as indicated by arrows as shown in FIG. 1. For example, a node 100 with hash key 0 can know information about a node 102 with hash key 1, which is a neighboring node immediately adjacent to the node 100 with hash key 0, a node 104 with hash key 2, a node 106 with hash key 4, and a node 114 with hash key 8.

In the chord distributed file system implemented as described above, for example, when the node 100 with hash key 0 receives a user request message for data corresponding to hash key 7, since the node 100 with hash key 0 does not know information on a node 112 with hash key 7, the node 100 transmits the user request message to the node 106 with hash key 4 among the node 102 with hash key 1, the node 104 with hash key 2, the node 106 with hash key 4 and the node 114 with hash key 8, which are identified by the node 100 and connected by arrows as shown in FIG. 1. In this case, since hash key 8 among the hash keys identified by the node 100 has a number exceeding 7, the node 100 with hash key 0 transmits the user request message to the node 106 with hash key 4, which is the largest value in the hash key numbers smaller than 7.

Then, the node 106 with hash key 4 transmits the user request message to a node 110 with hash key 6 among a node 108 with hash key 5, the node 110 with hash key 6, the node 114 with hash key 8 and a node 116 with hash key 12, which are identified by the node 106 and connected by arrows. In this case, since hash key 12 among the hash keys identified by the node 106 has a number exceeding 7, the node 106 with hash key 4 transmits the user request message to the node 110 with hash key 6, which is the largest value in the hash keys having numbers smaller than 7.

Then, in the same manner, the node 110 with hash key 6, which has received the user request message, searches for a node to which the user request message is to be transmitted among the nodes identified by the node 110. In this case, since the node 110 with hash key 6 knows the node 112 with hash key 7 corresponding to the user request message, the node 110 transmits the user request message to the node 112 with hash key 7.

Consequently, the node 100 with hash key 0, which has first received the user request message for requesting data corresponding to hash key 7, is able to read data in the above-described manner.

Figure 2:
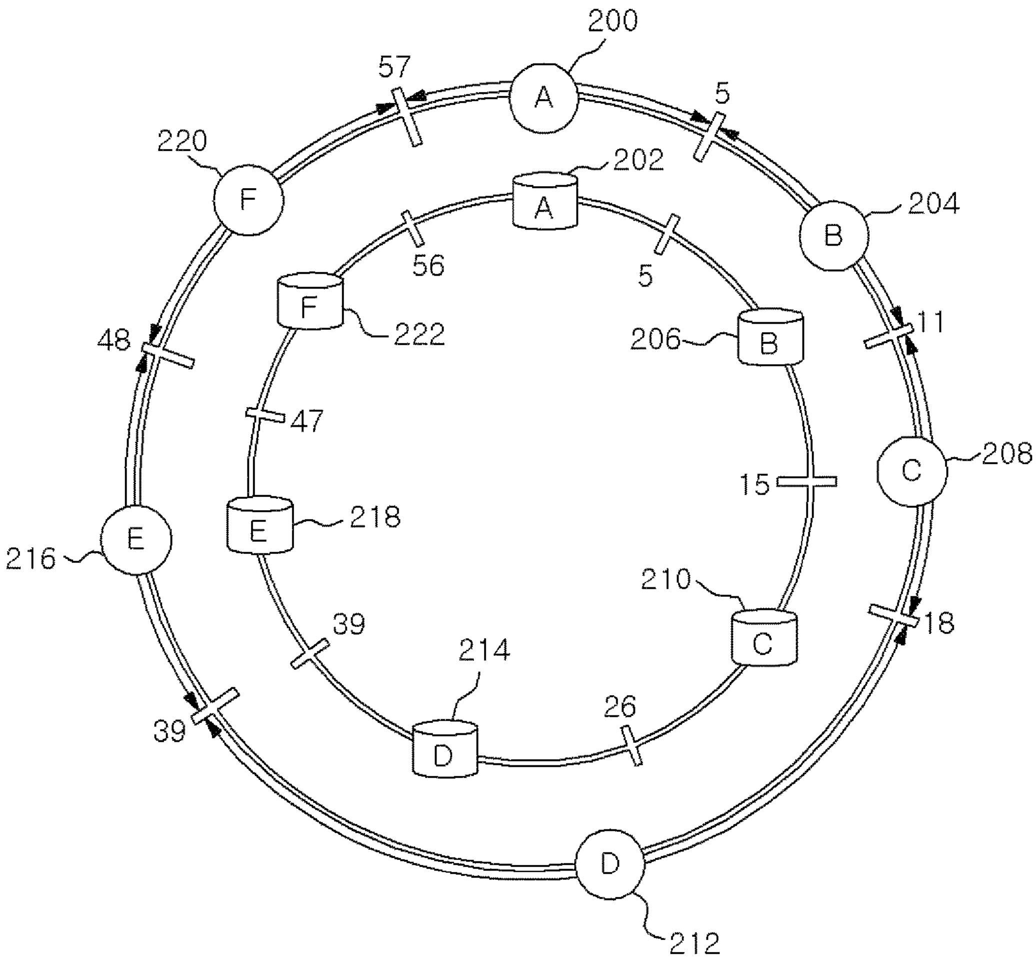
FIG. 2 is a conceptual diagram of managing data in a double-layered ring structure of file systems and in-memory caches based on a chord distributed hash table according to the embodiment of the present invention.

FIG. 2 illustrates a concept of managing data in a double-layered ring structure of file systems and in-memory caches based on the chord distributed hash table according to the embodiment of the present invention.

Referring to FIG. 2, in the present invention, file management is performed while each server has only information on its peers without a central directory as in the Hadoop or the like. This file management method is applied to not only a file system but also an in-memory cache which is a cache memory interworking with the file system, thereby managing files in a double-layered ring structure.

Hereinafter, an operation of the chord distributed file system based on the chord distributed hash table will be described in more detail with reference to FIG. 2.

First, the distributed file system that is managed by each server may include file systems 202, 206, 210, 214, 218 and 222 and in-memory caches 200, 204, 208, 212, 216 and 220 as shown in FIG. 2. In the present invention, by connecting the file systems and the in-memory caches of multiple servers in a double-layered ring structure, a data access request from the user can be processed. In this case, this file system may refer to a mass storage device such as a hard disk, and the in-memory cache may refer to a cache memory, but the present invention is not limited thereto.

Further, in the present invention, a data access request message for a specific file from the user can be processed by assigning a hash key range to the file system and the in-memory cache of each server, and allowing a job scheduler (to be described later) to manage information on these hash keys.

Each server may be configured to set a range of hash keys stored and managed by itself, and the range of hash keys may be set in both the file system and the in-memory cache.

For example, in server A, the file system 202 may be set to have a hash key range of 56 to 5 and store the hash keys corresponding to the hash key range, and the in-memory cache 200 may be set to have a hash key range of 57 to 5. Further, in server B, the file system 206 may be set to have a hash key range of 5 to 15 and the in-memory cache 204 may be set to have a hash key range of 5 to 11. Further, in server C, the file system 210 may be set to have a hash key range of 15 to 26 and the in-memory cache 208 may be set to have a hash key range of 11 to 18. Further, in server D, the file system 214 may be set to have a hash key range of 26 to 39 and the in-memory cache 212 may be set to have a hash key range of 18 to 39. Further, in server E, the file system 218 may be set to have a hash key range of 39 to 47 and the in-memory cache 216 may be set to have a hash key range of 39 to 48. Further, in server F, the file system 222 may be set to have a hash key range of 47 to 56 and the in-memory cache 220 may be set to have a hash key range of 48 to 57.

In this case, according to the present invention, differently from the file system, the in-memory cache may be set to change the hash key range based on the number of requests for data access to each server from the user. For example, in the case of server B, the file system 206 has a hash key range of 5 to 15, while the hash key range of the in-memory cache 204 may be changed and set to a range of 5 to 11.

The reason for changing and setting the hash key range of the in-memory cache is because an overhead is large when moving the hash key present in the file system to the file system of another server, but an overhead is relatively not large when moving the hash key present in the in-memory cache to the in-memory cache of another server. Also, it does not cause a problem because even if it is impossible to find data in the in-memory cache, the data can be found in the file system.

Therefore, in the present invention, it is possible to improve the data retrieval efficiency by changing and setting the hash key range assigned to the in-memory cache based on the number of requests for data access from the user.

The above-described operation of changing and setting the hash key range assigned to the in-memory cache will be described in more detail.

Figure 3:
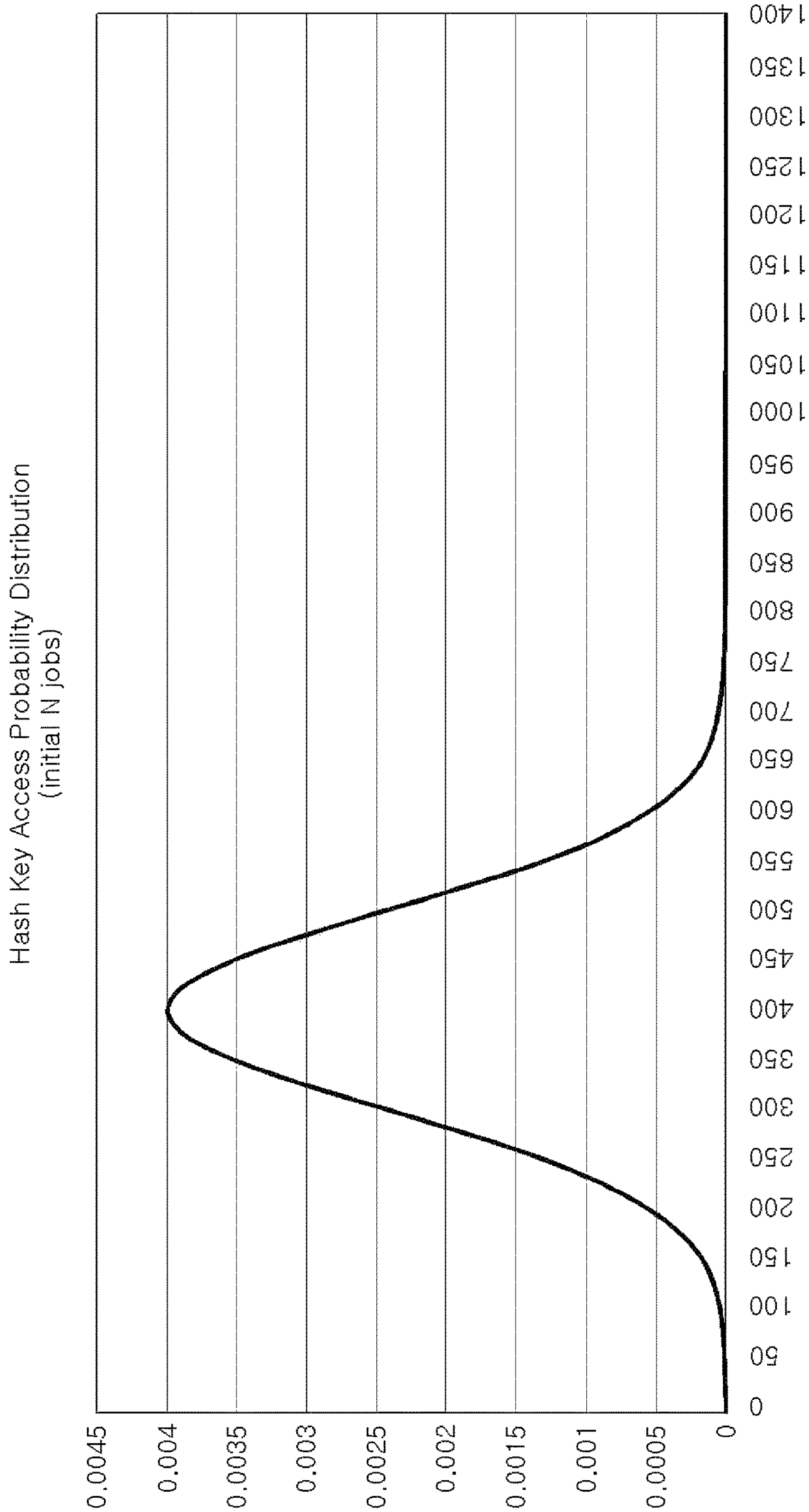
FIGS. 3 to 5 are exemplary graphs showing a data access probability distribution according to the embodiment of the present invention.

First, for the data managed by each server, a hash key access probability distribution of the recent n MapReduce tasks is assumed as a histogram shown in FIG. 3, and the histogram shown in FIG. 3 is managed as an old history. Then, when receiving the next n MapReduce tasks, a hash key access probability distribution of the next n MapReduce tasks is calculated as a histogram shown in FIG. 4, and the two histograms are combined by using a moving average formula.

Figure 4:
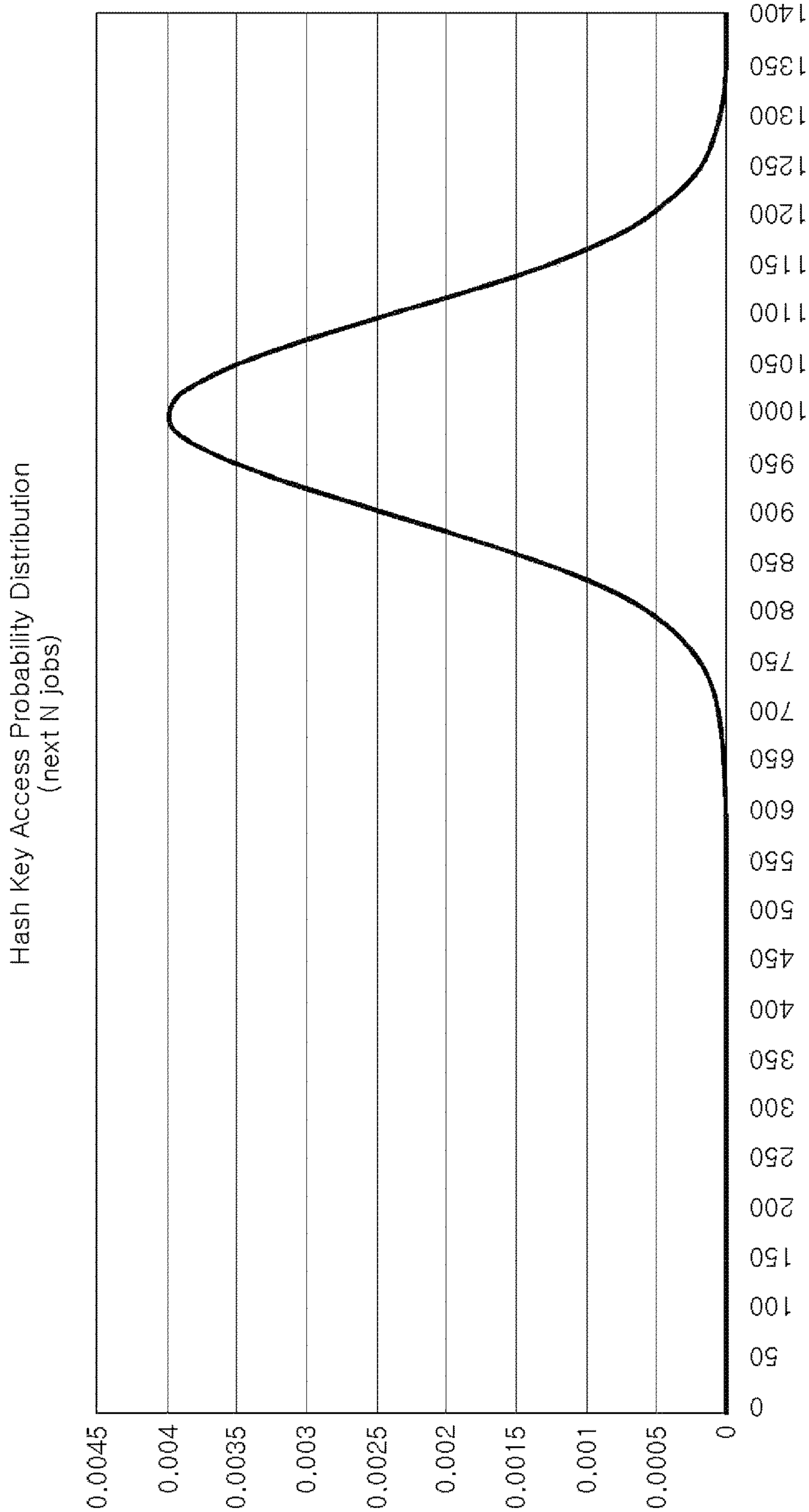
Figure 5:
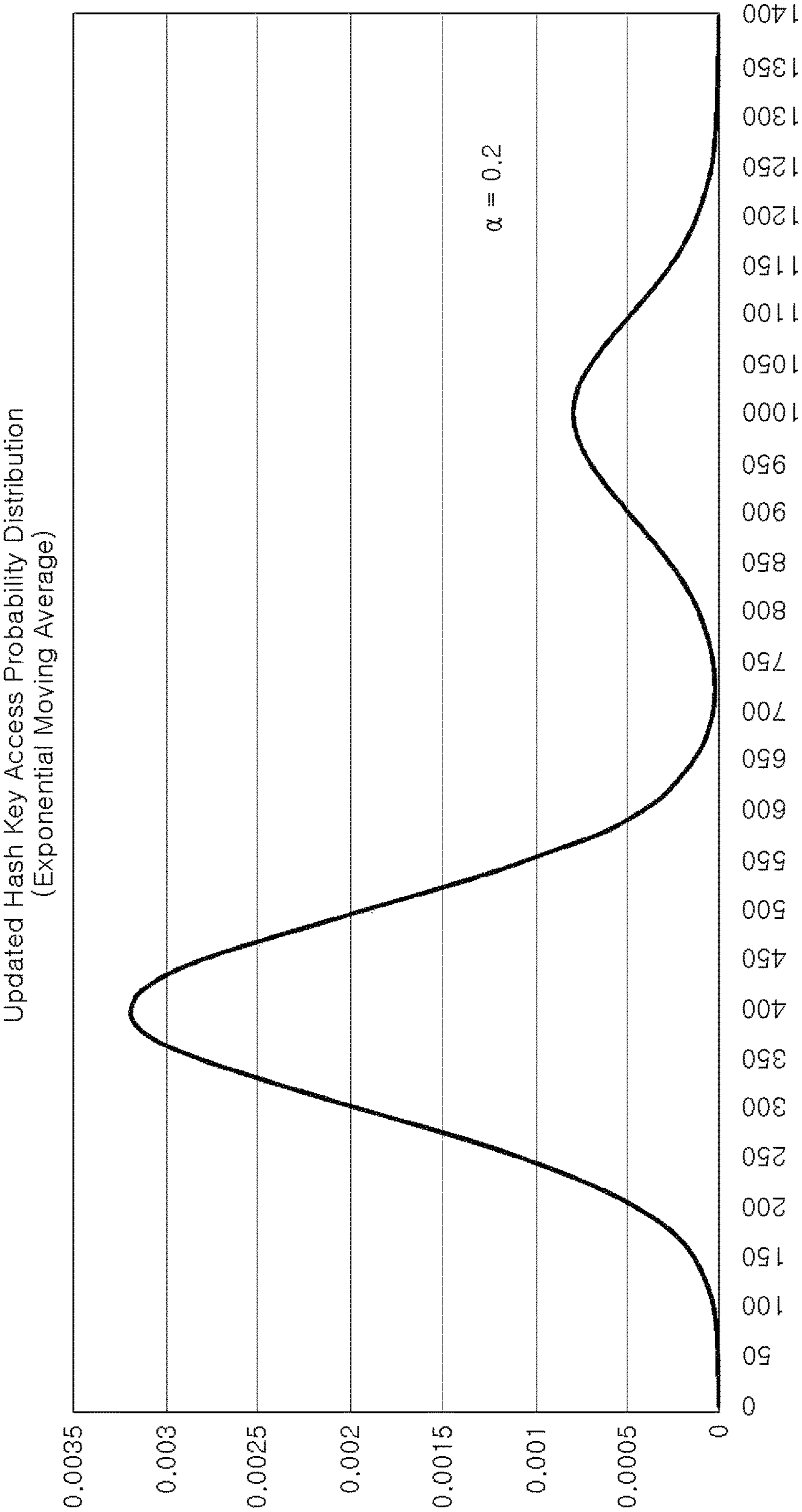

FIG. 5 shows a graph obtained by combining the previous histogram of FIG. 3 and the latest histogram of FIG. 4 according to the hash key access probability distribution by using a moving average formula. The graph shown in FIG. 5 may represent a probability distribution regarding the occurrence of data access in the hash key range.

Figure 6:
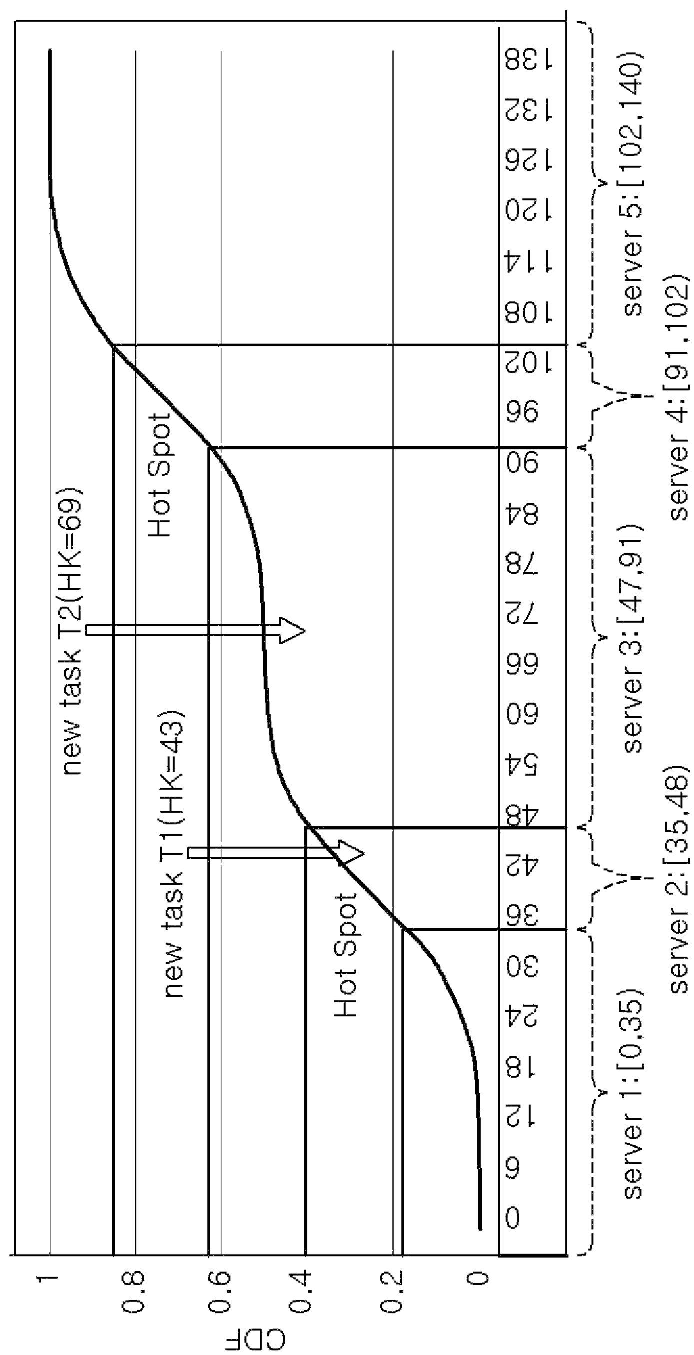
FIG. 6 is an exemplary graph showing a cumulative probability distribution according to the embodiment of the present invention.

Then, a graph of a cumulative probability distribution can be obtained as shown in FIG. 6 by using the probability distribution shown in FIG. 5.

As shown in FIG. 6, the cumulative probability distribution may be displayed such that the sections of the respective servers have the same probability distribution. In this case, the hash key range of the servers (server 2 and server 4), in which data access occurs relatively frequently, may be reduced, and the hash key range of the servers (server 1, server 3 and server 5), in which data access occurs relatively infrequently, may be widened. Accordingly, based on the hash key range as described above, the hash key range assigned to the in-memory cache of each server can be changed and set to a hash key range according to the data access of each server.

In the case of changing the hash key range as described above, the hash key range of the in-memory cache can be changed dynamically depending on the probability distribution regarding the occurrence of data access for each server differently from the hash key range originally assigned to the file system. Accordingly, it is possible to achieve the load balance for each server and improve the performance of the file system.

Referring back to FIG. 2, for example, in the case of server D, since data access occurs relatively infrequently in the in-memory cache 212 of server D, the in-memory cache 212 of server D may be set to have a wide hash key range so as to manage a large number of hash keys. In the case of server B, since data access occurs relatively frequently in the in-memory cache 204 of server B, the in-memory cache 204 of server B may be set to have a narrow hash key range so as to manage a smaller number of hash keys than the file system.

That is, in a conventional file system such as Hadoop, for example, all of the data access requests received in the hash key range of 5 to 15 are performed in server B. Thus, if a very large number of data access requests are received in the hash key range of 5 to 15, only server B is busy and the other servers are not utilized even though other available resources exist, which deteriorates the performance.

On the other hand, in the present invention, as shown in FIG. 2, by reducing the hash key range assigned to the in-memory cache 204 of server B for which data access occurs relatively frequently to reduce the load of server B, and allowing the remaining operations to be processed in server C, it is possible to achieve the load balance between servers and improve the performance.

Figure 7:
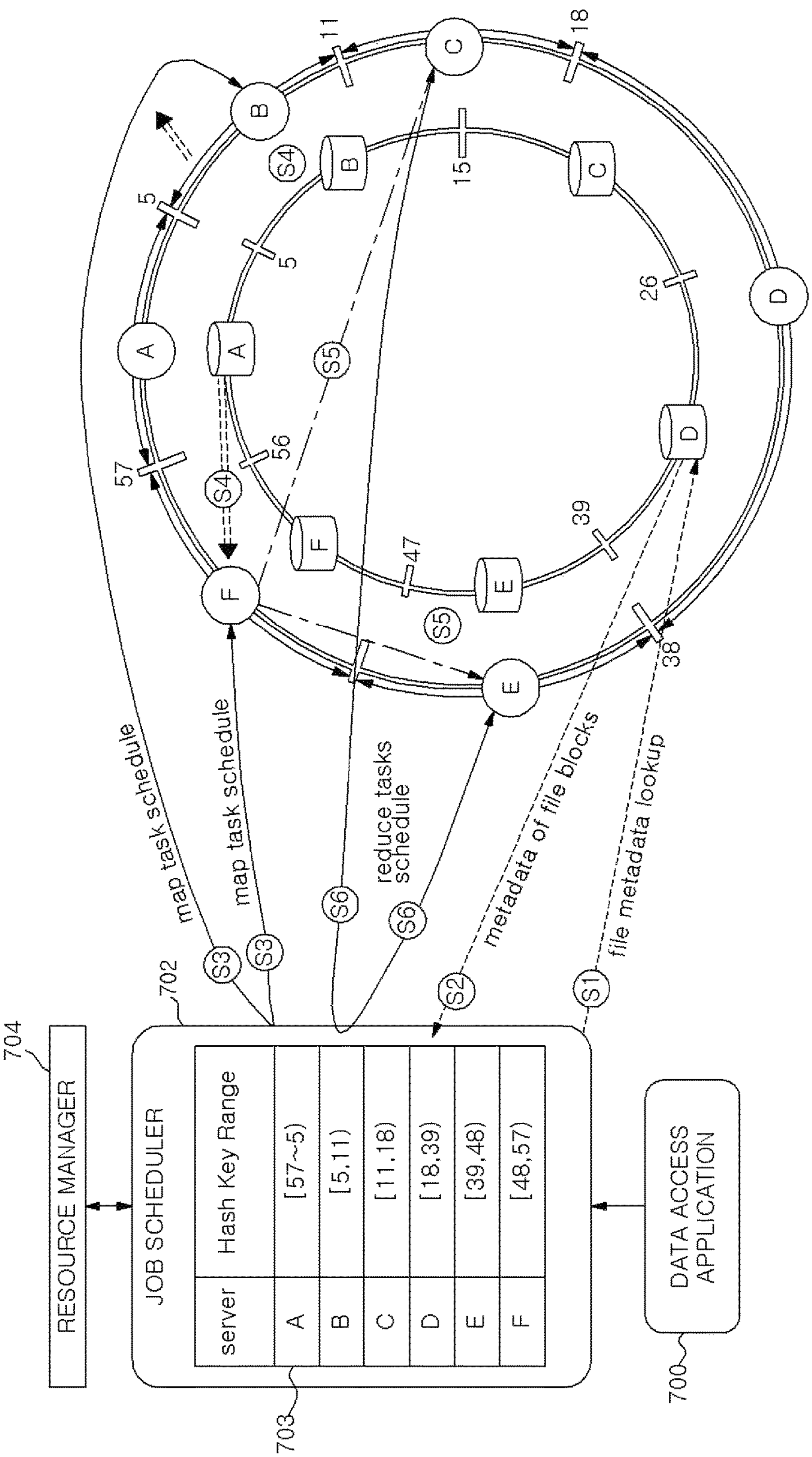
FIG. 7 is a conceptual diagram of an operation of performing MapReduce tasks in the chord distributed hash table based MapReduce system according to the embodiment of the present invention.

FIG. 7 illustrates a concept of an operation of performing MapReduce tasks in the chord distributed hash table based MapReduce system according to the embodiment of the present invention.

Referring to FIG. 7, the chord distributed hash table based MapReduce system may include a job scheduler 702, a resource manager 704, the file systems 202, 206, 210, 214, 218 and 222 and the in-memory caches 200, 204, 208, 212, 216 and 220 of multiple servers connected in a double-layered ring structure, and the like.

First, the job scheduler 702 manages data in a double-layered ring structure having a file system layer and an in-memory cache layer based on the chord distributed hash table, and allocates MapReduce tasks to each server. The resource manager 704 manages server addition, removal and recovery and the like, and also manages the upload of files.

When the job scheduler 702 allocates the MapReduce tasks to each server, each server accesses data blocks of the distributed hash table file system in a distributed manner. In this case, the job scheduler 702 and the resource manager 704 operating centrally may be implemented to perform only a minimum function for the scalability of the system.

Further, the job scheduler 702 determines the hash key of each data block based on a hash function, and determines which server will store each data block through the hash key.

Further, each server may store and manage up to m servers in the distributed hash table, and the value of m may be selected by a manager of the system. In this case, the value of m must satisfy $2^m-1>S$ when S is the total number of servers.

In this case, if the total number of servers in a cluster is less than one thousand, it is possible to access data at once by making m equal to the number of servers. Further, unlike a conventional dynamic peer-to-peer system in which server addition and removal occur frequently, the cluster configuration of the present invention is relatively static. Therefore, a large number of servers can be stored in the hash table without greatly affecting the scalability, and data access performance can be improved.

By using the distributed hash table having information about all servers, it is possible to directly access files in consideration of the key range of each file, and the scalability is excellent as compared with a conventional central-controlled system such as Hadoop. In particular, the hash table stored in each server does not store the metadata of all files, and stores only the hash key ranges of the servers. Accordingly, the capacity occupied by the hash table is very small and the overhead may be almost zero.

For example, when one server receives a data access request, after checking whether or not a hash key of data falls within the hash key range of the server, a file directory of the server provides data access if the hash key of data falls within the hash key range of the server. If the hash key of data falls within the hash key range of another server, the data access request is transmitted to the corresponding server.

The distributed hash table updates information of other servers only when server addition, removal or the like occurs. A failure of the server is detected while periodically sending and receiving heartbeat messages. If one server has a failure, the resource manager 704 may recover the lost file blocks from the replicated blocks of the other servers. The replication of the file blocks is carried out such that k file blocks are replicated through k different hash functions and stored in different servers, and the value of k may be adjusted by the system manager.

Further, the cache layer of the in-memory caches 200, 204, 208, 212, 216 and 220 may be managed to be divided into two partitions of dCache and iCache. The dCache is a partition storing the input data block, and the iCache is a partition that is a cache area where an intermediate result is reused, and may store data of an intermediate calculation result as a result of the map task. In other words, the in-memory cache based on the chord distributed hash table according to the present invention stores even an intermediate calculation result of the task to be reused, and can read out the data stored in the cache of another server in the same way as memcached, thereby further increasing the reusability. In this case, it may be particularly efficient because the data stored in another server is found by using the hash key of the chord distributed hash table. In addition, load imbalance can be eliminated by allowing access to the cache of another server even in a situation where the input data blocks are not uniformly distributed.

In general, in computation intensive tasks, the same application often requests the same input data. By way of example, database queries are processed by referring to the same table several times. Some studies show that at least 30% of the MapReduce tasks are performed repeatedly. Thus, it is possible to significantly reduce unnecessary redundant calculations through the in-memory cache of the present invention which stores the intermediate calculation result.

In this case, in order to retrieve the intermediate calculation result from the iCache, in the present invention, the metadata may be configured and managed to distinguish the intermediate calculation results such as an application ID, an input data block, and an application parameter. Thus, when receiving a new task, it is determined whether the intermediate calculation result can be reused by searching the metadata, and if the intermediate calculation result that can be reused is found, the stored intermediate calculation result may be immediately processed in a Reduce process without performing a Map process. Further, if the intermediate calculation result in the iCache cannot be reused, it is determined whether the input data block in the dCache is available, and if available, the input data is accessed directly from the cache. If the input data block is not available even in the dCache, the input data may be accessed through the distributed hash table file system layer.

Unlike the file system layer as described above, the hash key range of the in-memory cache is managed by the central job scheduler 702, and the hash key range is divided and assigned to each server. In this case, since the hash key range assigned to each server is dynamically adjusted, the input data for which access requests occur frequently is stored in multiple servers. For example, if many tasks request access to the same input data, in the present invention, the input data is replicated to multiple servers via locality-aware fair scheduling by the job scheduler, so that the input data can be processed in multiple servers. Therefore, it is possible to ensure the load balance while maximizing the cache utilization in successive tasks.

Hereinafter, the operation of performing MapReduce tasks in the chord distributed hash table based MapReduce system will be described in more detail with reference to FIG. 7.

Referring to FIG. 7, first, the job scheduler 702 assigns the hash key ranges of the in-memory caches 200, 204, 208, 212, 216 and 220 of the respective servers, and manages, for each server, the information of the hash key ranges of the file systems 202, 206, 210, 214, 218 and 222 as shown in FIG. 2.

In this state, a data access request for a specific file may be received from the user through a specific data access application 700.

When receiving the data access request, the job scheduler 702 may allocate the MapReduce tasks to the servers, which store the file for which the data access request has been received from the user, among the multiple servers, and output a value obtained as a result of performing the MapReduce tasks in response to the data access request.

That is, the job scheduler 702 can first obtain the hash key corresponding to the requested data by applying the name of the file, for which the data access request has been received from the user, to the hash function.

If it is assumed that the hash key of the requested data is hash key 38, the job scheduler 702 finds that hash key 38 is stored in server D storing hash keys 26 to 39 by referring to the hash key information assigned to the file system, and accesses the file system 214 of server D to obtain information about the file corresponding to hash key 38 (S1).

In this case, the file corresponding to hash key 38 is a single file, but this file may be split into several files to be distributed to multiple servers. However, even if the file corresponding to hash key 38 is split into several files to be distributed, server D has all information about the file corresponding to hash key 38.

For example, if the file corresponding to hash key 38 is divided into two data blocks to be distributed and the hash keys of the data blocks are hash keys 5 and 56, server D provides metadata information about this file to the job scheduler 702 (S2).

Then, the job scheduler 702 finds that the file corresponding to hash key 38 is divided into two data blocks and distributed to different servers by using the metadata information, and identifies the servers corresponding to the in-memory caches having the hash key ranges corresponding to hash key 5 and hash key 56 for the respective data blocks.

Since the hash key range assigned to the disk file system and the hash key range assigned to the in-memory cache may be different from each other, the job scheduler 702 identifies the in-memory caches corresponding to hash key 5 and hash key 56 by using a hash key range information table 703 assigned to the in-memory cache of each server.

Referring back to FIG. 7, it can be seen that the in-memory cache 204 of server B has hash key 5 and the in-memory cache 220 of server F has hash key 56.

Thus, the job scheduler 702 finds that the file, for which the data access request has been received, is divided into two data blocks and distributed and stored in different servers, and performs map task scheduling, for example, such that two mappers should be executed in server B and server F, respectively (S3).

Accordingly, the server performing the MapReduce receives map task schedule information from the job scheduler 702, executes a map function in each of server B and server F storing the distributed data blocks of the file to which access has been requested, and generates key-value data.

Meanwhile, if the data of hash key 5 and the data of hash key 56 are present in the in-memory cache 204 of server B and the in-memory cache 220 of server F, the job scheduler 702 may read the data immediately from the in-memory cache. However, if the data of each of hash key 5 and hash key 56 is not present in the corresponding in-memory cache, the job scheduler 702 may read the data from the file system.

In this case, as shown in FIG. 7, the data of hash key 56 is stored in the in-memory cache 220 of server F in the in-memory cache layer, but stored in the file system 202 of server A in the file system layer. Thus, a cache miss may occur. When a cache miss occurs, the job scheduler 702 may read the data of hash key 56 from the file system 202 of server A (S4).

Similarly, when a cache miss occurs because the data of hash key 5 is not present in the in-memory cache 204 of server B, the job scheduler 702 may read the data of hash key 5 from the file system 206 of server B storing the data of hash key 5. In the case of hash key 5, since the hash key range assigned to the in-memory cache 204 is similar to the hash key range assigned to the file system 206, it may be a case of reading the data from the file system of the same server.

Then, the server executes a map function for server B and server F as described above to obtain an intermediate calculation result. The intermediate calculation result may be derived as different hash keys according to the data blocks.

Thus, the job scheduler 702 may identify the number of the hash key outputted as an intermediate calculation result in the map task process, and store the hash key in the in-memory cache of the server having the corresponding hash key range. For example, when the hash keys corresponding to two output values are respectively mapped to the hash key range managed by the in-memory cache 216 of server E and the hash key range managed by the in-memory cache 208 of server C, the job scheduler 702 stores the hash keys of the result values in the in-memory cache 216 of server E and the in-memory cache 208 of server C (S5).

Then, the job scheduler 702 performs reduce task scheduling, for example, such that a reduce operation should be executed in each of server E and server C by informing the server that the intermediate calculation result values obtained by executing the map tasks are stored in server E and server C (S6).

Accordingly, a final result, i.e., an output file in response to the data access request, is generated by using a reduce function in server E and server C, and provided to the user.

As described above, according to the present invention, in the chord distributed hash table based MapReduce system, the data is managed in a double-layered ring structure having a file system layer and an in-memory cache layer based on the chord distributed hash table, and a probability distribution of the data access requests is predicted based on the frequency of the user's data access requests. Then, based on the predicted probability distribution, the hash key range of the chord distributed hash table of the in-memory cache layer is adjusted and tasks are scheduled. Therefore, it is possible to achieve load balancing and increase a cache hit rate.

While the invention has been shown and described with respect to the embodiments, it will be understood by those skilled in the art that various changes and modification may be made without departing from the scope of the invention as defined in the following claims.

What is claimed is:

1. A chord distributed hash table based MapReduce system comprising:

multiple servers including file systems and in-memory caches storing data based on a chord distributed hash table; and a job scheduler managing the data stored in the file systems and the in-memory caches in a double-layered ring structure, the job scheduler, when receiving a data access request for a specific file from an outside, allocating MapReduce tasks to servers that store the file for which the data access request has been received among the multiple servers, and outputting a result value obtained by performing the MapReduce tasks in response to the data access request, wherein the in-memory cache stores a hash key corresponding to data by using the chord distributed hash table, and after assigning a preset hash key range to the in-memory cache, stores a hash key included in the hash key range and data corresponding to the hash key.

2. The chord distributed hash table based MapReduce system of claim 1, wherein the job scheduler, when receiving the data access request, retrieves a server storing the file by extracting a hash key with a name of the file and checking a hash key range assigned to the in-memory cache of each server, receives metadata for the file from the retrieved server, and allocates the MapReduce tasks to the servers storing the file.

3. The chord distributed hash table based MapReduce system of claim 2, wherein the job scheduler receives, as the metadata, a data block structure for the file and information about servers storing distributed data blocks, and allocates the MapReduce tasks to the servers storing the data blocks.

4. The chord distributed hash table based MapReduce system of claim 1, wherein the job scheduler dynamically changes and sets, for each server, the hash key range of the in-memory cache of each server depending on frequency of requests for data access to each server.

5. The chord distributed hash table based MapReduce system of claim 1, wherein the job scheduler stores, in the file system, an intermediate calculation result generated in the MapReduce task processing for each data block of the file.

6. The chord distributed hash table based MapReduce system of claim 5, wherein the intermediate calculation result is generated to have a different hash key according to each data block and distributed to a different server.

7. The chord distributed hash table based MapReduce system of claim 5, wherein the intermediate calculation result is stored in an intermediate result reuse cache area of the in-memory cache.

8. The chord distributed hash table based MapReduce system of claim 1, further comprising a resource manager interworking with the job scheduler to manage server addition, removal and recovery or manage an upload of files.

9. A method of performing MapReduce tasks in a chord distributed hash table based MapReduce system comprising multiple servers including file systems and in-memory caches and a job scheduler allocating MapReduce tasks to the multiple servers, the method comprising:

managing, by the job scheduler, data stored in the file systems and the in-memory caches in a double-layered ring structure;

receiving a data access request for a specific file from an outside;

retrieving a server of a file system storing the file by extracting a hash key for the file;

receiving from the retrieved server, as metadata, a data block structure for the file and information about servers storing distributed data blocks among the multiple servers;

allocating MapReduce tasks to the servers storing the data blocks; and outputting a result value obtained by performing the MapReduce tasks in response to the data access request, wherein the in-memory cache stores a hash key corresponding to data by using the chord distributed hash table, and after assigning a preset hash key range to the in-memory cache, stores a hash key corresponding to the hash key range and data corresponding to the hash key.

10. The method of claim 9, wherein the file systems and the in-memory caches store the data based on the chord distributed hash table.

11. The method of claim 9, wherein the hash key range is dynamically changed and set for each server depending on frequency of requests for data access to each server.

12. The method of claim 9, wherein the MapReduce tasks are processed in the servers storing the data blocks, and an intermediate calculation result generated in the MapReduce task processing is stored in the file system.

13. The method of claim 12, wherein the intermediate calculation result is generated to have a different hash key according to each data block and distributed to a different server.

14. The method of claim 12, wherein the intermediate calculation result is stored in an intermediate result reuse cache area of the in-memory cache.

* * * * *